L. A. HILL.
DRIVE MECHANISM.
APPLICATION FILED NOV. 19, 1909.
963,557.
Patented July 5, 1910.
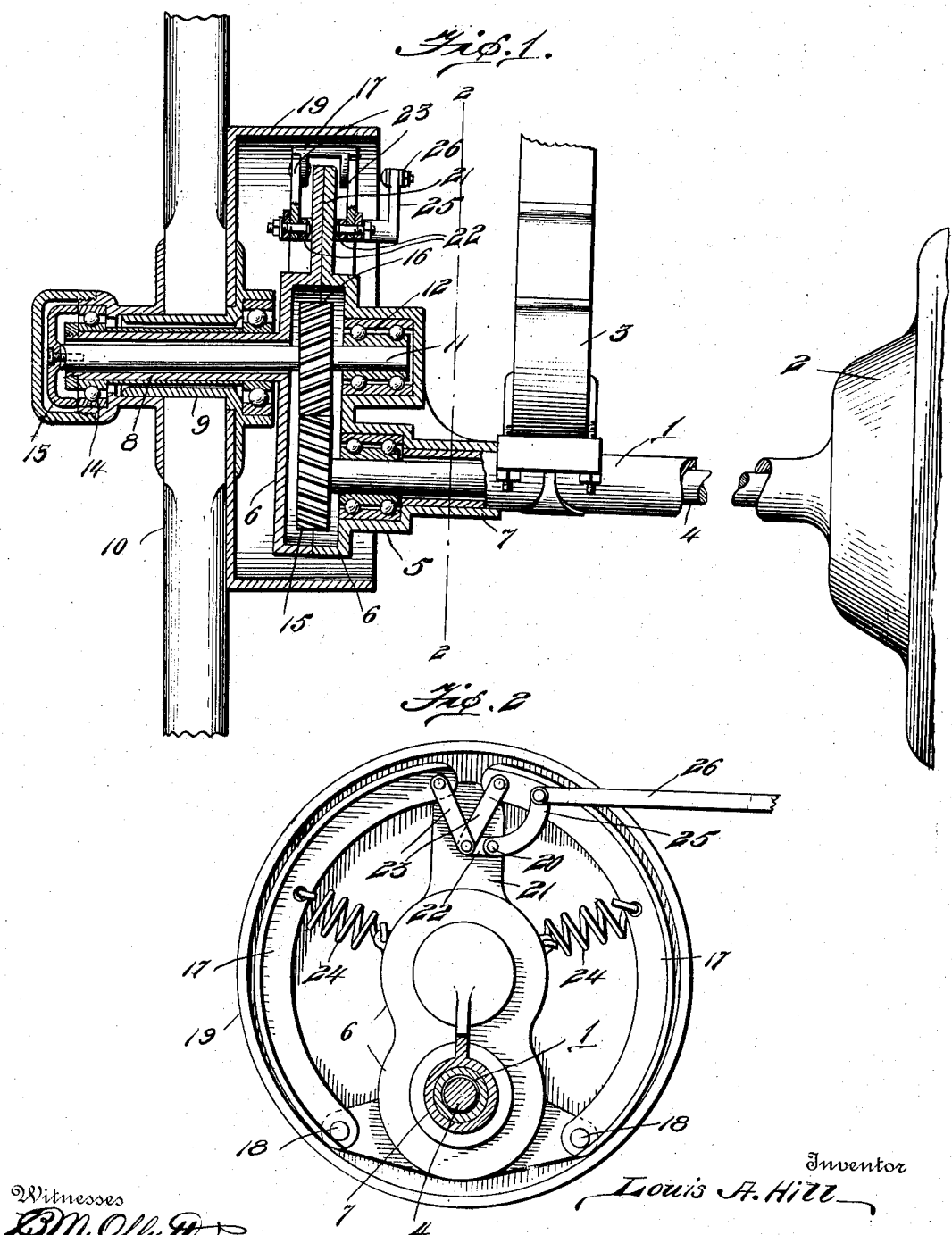

UNITED STATES PATENT OFFICE.

LOUIS A. HILL, OF WASHINGTON, DISTRICT OF COLUMBIA.

DRIVE MECHANISM.

963,557.   Specification of Letters Patent.   Patented July 5, 1910.

Application filed November 19, 1909. Serial No. 528,947.

*To all whom it may concern:*

Be it known that I, LOUIS A. HILL, a citizen of the United States, residing at Washington, in the District of Columbia, have invented certain new and useful Improvements in Drive Mechanisms, of which the following is a specification.

My invention relates to improvements in drive mechanisms for motor cars, and it consists in the constructions, combinations and arrangements herein described and claimed.

An object of my invention is to provide an improved drive mechanism adapted for efficient use with driving wheels of increased diameter, and which is constructed to permit the employment of large driving wheels without necessitating a corresponding elevation of the center of gravity of the car.

A further object of my invention is to provide an improved drive mechanism which will be thoroughly protected against external injury and the entrance of dust, and in which a lubricant will be permanently maintained and automatically distributed to the wearing surfaces.

A further object of my invention is to provide a strong and durable drive mechanism readily adapted for all types of cars, and which will operate at high efficiency under all practical conditions.

In the accompanying drawings, forming a part of this application and in which similar reference numerals indicate corresponding parts in the several views: Figure 1 is a detail view, partly in axial section, illustrating one embodiment of my invention, and Fig. 2 is a section on the line 2—2 of Fig. 1.

Referring to the drawings, 1 indicates a hollow supporting axle extending from a transmission-gear casing 2, and constituting a part of the running gear for supporting the rear body springs 3; a drive shaft 4 being journaled at 5 coaxially within the hollow axle 1 and operatively connected to any usual transmission gear in the casing 2.

Oil-tight casings 6 are shown provided with bosses 7 for rigidly securing them on the ends of the hollow axle 1, and are provided with hollow stub axles 8 for receiving the hubs 9 of the driving wheels 10; said stub axles being preferably inclined at approximately one and one-half degrees to the supporting axle in order to give the driving wheels an advantageous inclination.

Spindles 11 are journaled at 12 in the casings 6 and extend freely and coaxially through the hollow stub axles 8; the free outer ends of said spindles being connected, as by clips 13, to the wheel hubs 9. The spindles 11 are thus rotatably supported at their inner ends by the bearings 12, and at their outer ends by the bearings 14 of the wheel hubs on the stub axles; thereby providing a very efficient drive connection operating with a minimum of friction.

The shaft 4 is shown connected to the angularly disposed spindles 11 by any usual intermeshing bevel gears 15 and 16 in the casings 6; a lubricant being maintained in the lower portions of said oil-tight casings, from which it is carried up by the gears 15 and 16 and distributed to the bearings 5 and 12 and along the spindles 11 to the bearings 14 of the driving-wheel hubs 9. It will be noted that the hollow supporting axle 1 and its casing 2 communicate with the casings 6, thereby providing a construction in which the drive mechanism is completely inclosed in a continuous oil-tight casing.

Brake shoes 17 are pivoted at 18 to the casings 6, for engagement with a brake drum 19 secured coaxially to the driving wheel. A spindle 20 extends through flanges 21 on the casing 6, and carries at the opposite sides of the latter cranks 22 which are connected by links 23 to the free ends of the shoes 17; said cranks and links constituting toggle joints for strongly forcing the brake shoes against the tension of springs 24 against the drum 19. The brake can be operated in any desired manner, as by a bent crank 25 secured to the spindle 20 and connected to a brake rod 26.

From the above description, it will be understood that my invention provides an improved construction, in which the gears 15 and 16 can be formed of suitable size to position the center of gravity of the car as low as desired irrespective of the size of the driving wheels employed; and that the relative proportions of the gears 15 and 16 can be readily designed to provide any required speed reduction in the drive mechanism.

My invention provides an improved construction, in which the entire weight of the car is firmly supported on the running gear, thereby relieving the drive mechanism from all load; thus providing a construction operating at high efficiency with a minimum of strain and friction and with a positive automatic lubrication.

I have illustrated and described preferred and satisfactory constructions, but changes could be made within the spirit and scope of my invention.

Having thus described my invention, what I claim as new and desire to secure by Letters Patent is:

1. In a motor car, the combination of a hollow supporting axle, a shaft journaled therein, casings extending upwardly from the ends of said axle and provided above the latter with journal bearings and hollow stub axles, driving wheels on said stub axles, spindles journaled in said bearings and extending through said stub axles, means for connecting said spindles to the driving wheels, and actuating connections between said shaft and spindles, substantially as described.

2. In a motor car, the combination of a hollow supporting axle, a shaft journaled in said axle, casings secured to the ends of said axle and provided with hollow stub axles extending angularly to said shaft, driving wheels on said stub axles, spindles extending coaxially through said stub axles, means for connecting said spindles to the driving wheels, and actuating connections within said casings between said shaft and spindles, substantially as described.

3. In a motor car, the combination of a hollow supporting axle, a shaft journaled in said axle, casings secured to the ends of said axle and provided with hollow stub axles extending angularly to said shaft, driving wheels on said stub axles, spindles extending coaxially through said stub axles, means for connecting said spindles to the driving wheels, and intermeshing bevel gears secured to said shaft and spindles within said casings, substantially as described.

4. In a motor car, the combination of a hollow supporting axle, upwardly-extending casings secured to the ends of said axle, a shaft journaled coaxially within said axle with its ends extending in said casings, hollow stub axles carried by said casings in communication with the interior of the latter, spindles extending through said stub axles, actuating connections in said casings between said shaft and spindles, driving wheels rotatably mounted on said stub axles, means for connecting the outer ends of said spindles to the hubs of said driving wheels, and oil-tight closures for closing the outer ends of said hubs in communication with said hollow stub axles, substantially as described.

In testimony whereof I affix my signature in presence of two witnesses.

LOUIS A. HILL.

Witnesses:
C. F. FADELEY,
WILLIAM McNEIR.